US009256880B2

(12) United States Patent
Wada et al.

(10) Patent No.: US 9,256,880 B2
(45) Date of Patent: Feb. 9, 2016

(54) SYSTEM AND METHOD FOR DOWNLOADING A SAFETY INSPECTION ITEM

(71) Applicant: Nippon Gas Co., Ltd., Tokyo (JP)

(72) Inventors: Shinji Wada, Tokyo (JP); Shingo Dekamo, Tokyo (JP)

(73) Assignee: Nippon Gas Co., Ltd., Tokyo (JP)

( * ) Notice: Subject to any disclaimer, the term of this patent is extended or adjusted under 35 U.S.C. 154(b) by 0 days.

(21) Appl. No.: 14/414,431

(22) PCT Filed: Jul. 12, 2013

(86) PCT No.: PCT/JP2013/004319
§ 371 (c)(1),
(2) Date: Jan. 12, 2015

(87) PCT Pub. No.: WO2014/010254
PCT Pub. Date: Jan. 16, 2014

(65) Prior Publication Data
US 2015/0170159 A1 Jun. 18, 2015

(30) Foreign Application Priority Data

Jul. 13, 2012 (JP) ................................ 2012-158098

(51) Int. Cl.
*G06F 17/00* (2006.01)
*G06Q 30/00* (2012.01)
(Continued)

(52) U.S. Cl.
CPC .............. *G06Q 30/018* (2013.01); *G06Q 10/06* (2013.01); *G06Q 50/06* (2013.01)

(58) Field of Classification Search
USPC ...................... 235/375, 376, 462.09; 705/412
See application file for complete search history.

(56) References Cited

U.S. PATENT DOCUMENTS

| 7,895,052 B1 * | 2/2011 | Theriot et al. ................. 705/1.1 |
| 2010/0250468 A1 * | 9/2010 | Theriot et al. ................. 705/413 |
| 2015/0058066 A1 * | 2/2015 | Wada .......................... 705/7.25 |

FOREIGN PATENT DOCUMENTS

| JP | H0949745 | 2/1997 |
| JP | H11134369 | 5/1999 |

(Continued)

OTHER PUBLICATIONS

The International Preliminary Report on Patentability mailed Jan. 22, 2015 for PCT application No. PCT/JP2013/004319, 6 pages.
(Continued)

*Primary Examiner* — Ahshik Kim
(74) *Attorney, Agent, or Firm* — Lee & Hayes, PLLC

(57) ABSTRACT

In a safety operation for LP gas, a safety inspector selects an inspection slip and determines whether an inspection item is necessary depending on the facility. Therefore, mistakes and omissions in the inspection content occur, and problems occur, such as visiting the actual site again to perform re-inspection. Furthermore, inspection slips that were manually filled are taken back to his or her office to input into a PC. Therefore, problems occur such as increases in workload due to erroneous entry of data and data re-entry, and time lags until inspection results are reflected in the safety management system. By reading a two-dimensional code attached to the main body of LP gas supply facility and consumption facility, the inspection slip (inspection items) related to each safety operation is downloaded to a mobile terminal in real-time at the operating sites, and inspection results are aggregated on a server by data communication.

18 Claims, 9 Drawing Sheets

(51) Int. Cl.
*G06Q 10/06* (2012.01)
*G06Q 50/06* (2012.01)

(56) References Cited

FOREIGN PATENT DOCUMENTS

| JP | 2000215375 | 8/2000 |
|---|---|---|
| JP | 2008021078 | 1/2008 |
| JP | 2010079926 | 4/2010 |
| JP | 2010165317 | 7/2010 |
| JP | 2011227561 | 11/2011 |

OTHER PUBLICATIONS

The PCT Search Report mailed Aug. 20, 2013 for PCT Application No. PCT/JP2013/004319, 2 Pages.

* cited by examiner

| | |
|---|---:|
| PARENT/CHILD CLASSIFICATION | 0 |
| METER COMPANY NUMBER | PATK12345123456 |
| MANUFACTURER CODE | PAT |
| MODEL TYPE | K12345 |
| SERIAL NUMBER | 123456 |

FIG.4

| CUSTOMER CODE | CUSTOMER CLASSIFICATION | METER COMPANY NUMBER | SUPPLY FACILITY CODE |
|---|---|---|---|
| 00000001 | 0 | PATK12345123456 | 00001 |
| 00000002 | 0 | PATK11111222222 | 00002 |
| 00000003 | 1 | TOK033333222222 | 00003 |
| 00000004 | 0 | PATK11111333333 | 00004 |
| 00000005 | 0 | PATK44444666666 | 00005 |
| 00000006 | 0 | PATK44444555555 | 00006 |
| 00000007 | 1 | TOKA3333344444 | 00007 |
| 00000008 | 1 | TOK000000666666 | 00008 |
| 00000009 | 0 | PATKATA01777777 | 00009 |
| 00000010 | 1 | TOKTA0123222222 | 00010 |
| . | . | . | . |
| . | . | . | . |
| . | . | . | . |

FIG.5

| SUPPLY FACILITY CODE | SUPPLY CLASSIFICATION | CYLINDER CLASSIFICATION | METER COMPANY NUMBER |
|---|---|---|---|
| 00001 | 0 | 1 | PATKKATA0777777 |
| 00002 | 0 | 0 | PATKK4444555555 |
| 00003 | 1 | 0 | TOKAK3333444444 |
| 00004 | 0 | 1 | PATKK1111333333 |
| 00005 | 0 | 1 | PATKK4444666666 |
| 00006 | 0 | 0 | PATKK1111222222 |
| 00007 | 1 | 1 | TOKKTA012222222 |
| 00008 | 1 | 0 | TOKK00000666666 |
| 00009 | 0 | 0 | PATKK1111222222 |
| 00010 | 1 | 1 | TOKK03333222222 |
| . | . | . | . |
| . | . | . | . |
| . | . | . | . |

FIG.6

| ID | CUSTOMER TYPE | SUPPLY CLASSIFICATION | CYLINDER CLASSIFICATION | PERIODICAL INSPECTION | PIPING INSPECTION | BULK CHECK | PIPELINE LEAKAGE | PART REPLACEMENT |
|---|---|---|---|---|---|---|---|---|
| 1 | 0 | 0 | 0 | 1 | 1 | 0 | 0 | 1 |
| 2 | 0 | 0 | 1 | 1 | 1 | 1 | 0 | 1 |
| 3 | 99 | 1 | 0 | 1 | 1 | 0 | 0 | 1 |
| 4 | 99 | 1 | 1 | 1 | 1 | 1 | 0 | 1 |
| 5 | 0 | 1 | 0 | 1 | 1 | 0 | 0 | 1 |
| 6 | 0 | 0 | 1 | 1 | 1 | 0 | 0 | 1 |
| 7 | 99 | 0 | 0 | 1 | 0 | 0 | 1 | 1 |
| 8 | 99 | 0 | 1 | 1 | 0 | 0 | 1 | 1 |
| 9 | 1 | 0 | 0 | 1 | 0 | 0 | 0 | 1 |
| 10 | 1 | 0 | 1 | 1 | 0 | 0 | 0 | 1 |

FIG.7

SYSTEM AND METHOD FOR DOWNLOADING A SAFETY INSPECTION ITEM

TECHNICAL FIELD

The present invention relates to downloading of safety inspection items. More specifically, the present invention relates to a method and a system for downloading inspection items in a safety operation for liquid petroleum (LP) gas supply facility and consumption facility.

BACKGROUND ART

Conventionally, LP gas is classified into gas imported from producers of industrial gas, and gas generated domestically during the manufacture of petrochemical products. Import stations of storing the LP gas transported by tankers from the industrial gas producers and oil refinery stations are called the primary stations. The LP gas in the primary station is loaded into coastal vessels and tank trucks, and shipped to the secondary stations, which are transit stations located along or away from the coasts. Further, the LP gas carried to the secondary stations is transported to LP gas filling stations (delivery bases) in various places, and is filled in gas cylinders in the delivery bases. The gas cylinders filled with the LP gas in the individual delivery bases are delivered by deliverymen to customers' homes, such as general houses, apartment buildings and offices. This is a supply method with a gas cylinder. Another supply method is a supply system with a gas bulk. This is a method for supplying gas from tank trucks directly to a gas bulk in customer's home. In the description of the present invention, there is a case wherein a gas cylinders and a gas bulk are collectively referred to as "gas cylinders".

For LP gas supplied by these methods, there is a possibility leading up to pollution, such as a gas leakage or a gas explosion. Therefore, there is the law in Japan for ensuring safety, anti-pollution and optimization of transaction of LP gas as main purposes. According to the law, gas suppliers are obligated to conduct periodical inspections of LP gas supply facility and consumption facility. It should be noted that the supply facility represents a section extended from a gas cylinder to the outlet of a gas meter. The gas facility is obligated to conduct periodical inspections under administrative control and responsibly in the gas suppliers. The consumption facility represents a section extended from the outlet of a gas meter to each gas appliance (e.g., a gas stove or a water heater). This facility is under administrative control and responsibly in a customer, and as well as the supply facility, a periodical inspection by the gas supplier is required.

There are two types of law for obligating periodical inspections: the "Act on the Securing of Safety and the Optimization of Transaction of Liquefied Petroleum Gas" (hereinafter referred to as the "Liquefied Petroleum. Gas Act") and the "Gas Business Act", both of which are separated based on supply forms. The Liquefied Petroleum Gas Act stipulates, as LP gas supply forms, a direct supply form for delivering gas cylinders to customers (hereinafter referred to as "general supply") and a form whereby a simplified gas generator, also called a gas facility, is installed and vaporizes LP gas, and the thus generated gas is supplied through pipelines to a plurality of customers. It should be noted, however, that the Liquefied Petroleum Gas Act is applied for a service area wherein the number of supply destinations, i.e., the number of customers, is smaller than seventy. In a case wherein the number of customers is seventy or greater, the Gas Business Act is applied. As described above, although the installed facility is the same, the different Act is applied in accordance with the number of supply destinations. To classify the individual supply forms, the supply form employed for the Liquefied Petroleum Gas Act is called "concentric gas (supply)" and that employed for the Gas Business Act is called "community gas (supply)". Further, there is a case wherein both for the concentric gas and the community gas, a gas facility as a supply facility is called a "parent", while a consumption facility in a customer is called a "child". It should be noted that the destinations of supply by the gas facility are not a plurality of "consumption facilities", but a plurality of "customers" (it is possible that a customer owns a plurality of consumption facilities, and eventually, gas supply may be performed for a plurality of consumption facilities).

According to the Liquefied Petroleum Gas Act, a periodical inspection is obligated once every four years for the supply facility and the consumption facility for gas cylinders. It should be noted that the periodical inspection includes a piping inspection to inspect gas pipes. In the piping inspection, in a case of a white gas pipe that tends to be corrosive (an old-fashioned plated gas pipe), in principle, the annual inspection is obligated. For a gas bulk, there is also a case wherein the inspection should be conducted in a shorter period cycle, such as every six months or every year. Further, in a case wherein re-inspection is required as the result of the periodical inspection for the consumption facility, the re-inspection must be obligated within one month to sixth months following the inspection date. The requirement for re-inspection is limited to the case of the consumption facility, because the consumption facility is consistently owned by the customer, and the gas supplier can merely request that the customer take a corrective measure. Therefore, when a predetermined period has elapsed from the request, the re-inspection is conducted for the corrective measure. If the corrective measure is not yet taken at the time of re-inspection, and it is determined that it is at high risk to continuously supply gas, it stops supplying gas (so-called a closing cock measure). In contrast, the supply facility belongs to the gas supplier, and the immediate inspection can be conducted if the re-inspection is required, so that any specific period of time for the re-inspection is not stipulated by the Liquefied Petroleum Gas Act.

According to the Gas Business Act, the periodical inspection for every forty months for the consumption facility is obligated. A period for conducting the periodical check of a gas facility, which is supply facility, varies depending on the facility level. More specifically, a daily check is obligated for the facility that employs a system for forcibly vaporizing LP gas by using electricity or a gas, a monthly check is obligated for the facility with an automatic monitoring device being attached, and a weekly check is obligated for the other type of facility. Furthermore, likely to the Liquefied Petroleum Gas Act, the re-inspection for the consumption facility is obligated within one month to sixth months following the inspection date. Moreover, for the supply facility, the re-inspection for a pipeline leakage is obligated once every forty months. The pipeline represents a gas pipe that is employed for community gas supply and that is embedded underground and extended in parallel to a road (meanwhile, gas pipes extended from the pipeline to the individual customers are called "supply lines").

In addition to the above described inspections, periodical replacement of parts, such as a gas alarm device, a gas meter, a gas pressure regulator and a gas hose, is also performed to provide the maintenance and the replacement operation for these parts. Especially, parts should be replaced before their expiry dates, since there are many types of parts and different expiry dates are provided for the individual types.

In the description of this invention, "inspection", "check" and "survey" are employed in accordance with cases. The "inspection" represents an operation for examining all the facility, including the consumption facility in the customer's home, the "check" represents an operation for examining only of the supply facility, and the "survey" represents an extension of "check" for more closely surveying the supply facility. Further, in some cases, the "inspection", the "check" and the "survey" are collectively referred to as the "inspection". The inspection operation and the parts replacement operation are collectively called a safety operation.

As described above, many inspections are conducted for the LP gas supply facility and consumption facility and the periodical replacement for many types of parts is performed. Safety inspectors perform these safety operations, and submit inspection slips describing the results.

However, at present, paper-based inspection slips are employed. The inspection slips are divided into two types, one type each for the Liquefied Petroleum Gas Act and for the Gas Business Act, and furthermore, in case of the Liquefied Petroleum Gas Act, the inspection slip differs for gas cylinders and for gas bulks, so that the total of three types of inspection slips are provided. The safety inspector carries these three types of inspection slips, and selects an appropriate slip in accordance with the facility. Further, inspection items that are not actually necessary in accordance with the type of a safety operation are also included in the inspection slip. On this point, a determination for unnecessary inspection items is also performed by the safety inspector. Further, a determination for compulsory inspection items is also left to the safety inspector. Under these circumstances, there are problems that omissions or errors in entries of the inspection are found, and the safety inspector visits the actual site again to perform re-inspection.

The safety inspector returns to his or her office with the inspection slips that were manually filled in at the operational sites, and employs a PC terminal to enter data to a safety management system. However, the data entry is not always performed by the safety inspector, and correct data may not be entered. Various problems occur due to erroneous entry of data, the increase in workload for re-entering data due to the erroneous entry of data, and the occurrence of a time lag until the inspection results are reflected in the safety management system.

To resolve these problems, there has been a demand on a method and a system, wherein a two-dimensional code, such as a QR code (registered trademark), is attached to the LP gas supply facility and consumption facility, and safety inspectors read the code by using mobile terminals carried by the safety inspectors, and download, into the mobile terminals, the inspection slips (inspection items) corresponding to the individual safety operations in real-time at operating sites, and a server collects all the inspection results through data communication.

SUMMARY OF INVENTION

In order to achieve the objective of the present invention, method for creating inspection slip data for consumption facility and supply facility associated with LP gas in a safety management server, the method comprising:

the safety management server receiving two-dimensional code data that is read via a mobile terminal and includes facility data for the consumption facility or the supply facility;

the safety management server extracting the facility data from the received two-dimensional code data; and the safety management server selecting, based on the extracted facility data, inspection item data that are components of the inspection slip data, to create the inspection slip data.

Further, the invention described in the foregoing paragraph, wherein the extracted facility data includes at least data representing the extracted facility data as data related to the consumption facility or as data related to the supply facility.

Furthermore, the invention described in the two foregoing paragraphs, wherein the creating the inspection slip data includes creating inspection menu data for specifying a type of an inspection slip.

Moreover, the invention described in the three foregoing paragraphs further comprising:

the safety management server transmitting, to the mobile terminal, the created inspection slip data; and the safety management server receiving inspection result data that is entered via the mobile terminal.

Further, the invention described in the four foregoing paragraphs, wherein the two-dimensional code data is QR code data.

ADVANTAGEOUS EFFECTS OF INVENTION

As described above, according to the present invention, by reading the two-dimensional code attached to the main bodies of LP gas supply facility and consumption facility, the inspection slips (inspection items) corresponding to the individual safety operations can be downloaded in real time into the mobile terminals at the operating sites, and all the inspection results can be collected together at the server through data communication.

BRIEF DESCRIPTION OF DRAWINGS

FIG. 4 is a diagram showing two-dimensional code data provided for the main bodies of consumption facility and supply facility according to the embodiment of the present invention;

FIG. 5 is a diagram showing customer data according to the embodiment of the present invention;

FIG. 6 is a diagram showing supply facility data according to the embodiment of the present invention;

FIG. 7 is a diagram showing inspection pattern data according to the embodiment of the present invention;

DESCRIPTION OF EMBODIMENTS

A method and a system according to one embodiment of the present invention will now be described while referring to the accompanying drawings.

Figure 1:
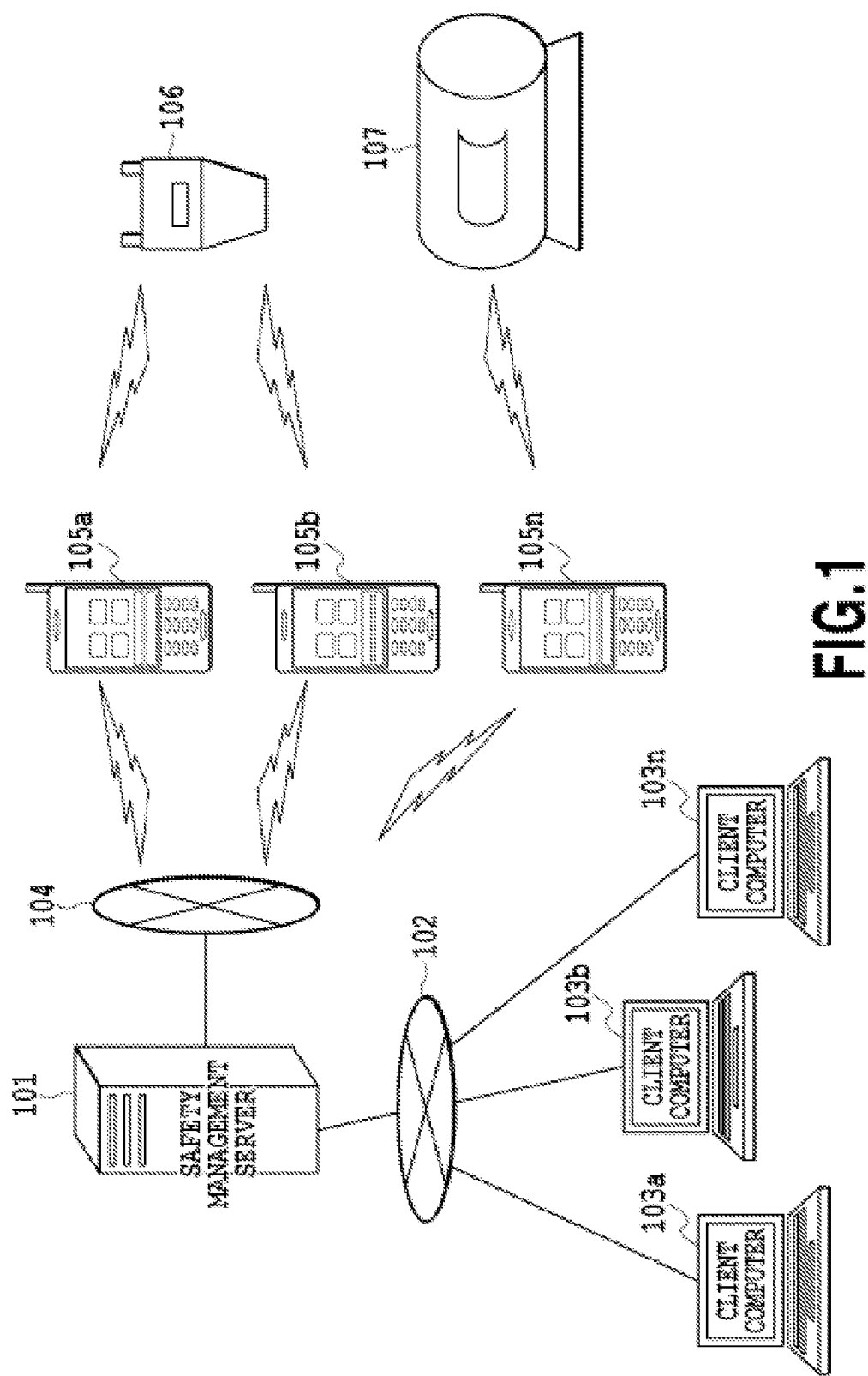
FIG. 1 is a diagram illustrating a network configuration according to one embodiment of the present invention.

FIG. 1 is a diagram illustrating a network configuration according to the embodiment of the present invention. In FIG. 1, a safety management server 101 located in, for example, a data center is configured to communicate via a network 102 with a plurality of client computers 103a, 103b, . . . and 103n (hereinafter, collectively referred to as client computers 103) located in, for example, individual branch offices. The safety management server 101 is also configured to communicate via a network 104 with a plurality of mobile terminals 105a, 105b, . . . and 105n (hereinafter collectively referred to as mobile terminals 105). The mobile terminals 105 are carried by persons, such as safety inspectors, who are in charge of the safety operation. Further, two-dimensional codes assigned for consumption facility 106 and supply facility 107 are configured to be read by using the mobile terminals 105.

An inspection application for the consumption facility 106 and the supply facility 107 is preinstalled in the motile terminals 105. The inspection application for the embodiment is, configured to for example, display a QR code reading screen when being activated, transmit the obtained QR code data to the safety management server 101 when reading of the QR code of the consumption facility 106 or the supply facility 107 is successful, and download inspection slip data, which is created by the safety management server 101. The inspection application is also configured to display the downloaded inspection slip data on the screen, and when the safety inspector enters inspection items, check the input data, and transmit the inspection results to the safety management server 101.

A label for the two-dimensional code where data for either the consumption facility 106 or the supply facility 107 is embedded, is attached to the corresponding facility.

When the mobile terminal 105 reads the two-dimensional code attached to the consumption facility 106 or the supply facility 107, the inspection application of the mobile terminal 105 configured to transmit the obtained two-dimensional code data to the safety management server 101.

Upon receiving the two-dimensional code data, the safety management server 101 selects inspection item data based on the two-dimensional code data, and creates inspection slip data and transmits the data to the mobile terminal 105. The motile terminal 105 receives the inspection slip data and displays the data on the output device. Thereafter, when the inspection results are entered to the individual inspection items of the inspection slip through the input device of the mobile terminal 105, the inspection application configured to check the input data, and transmit the inspection result data to the safety management server 101.

The safety management server 101 receives and stores the inspection result data. Then, the inspection result data can be browsed by the client computers 103 or the mobile terminals 105.

Figure 2:
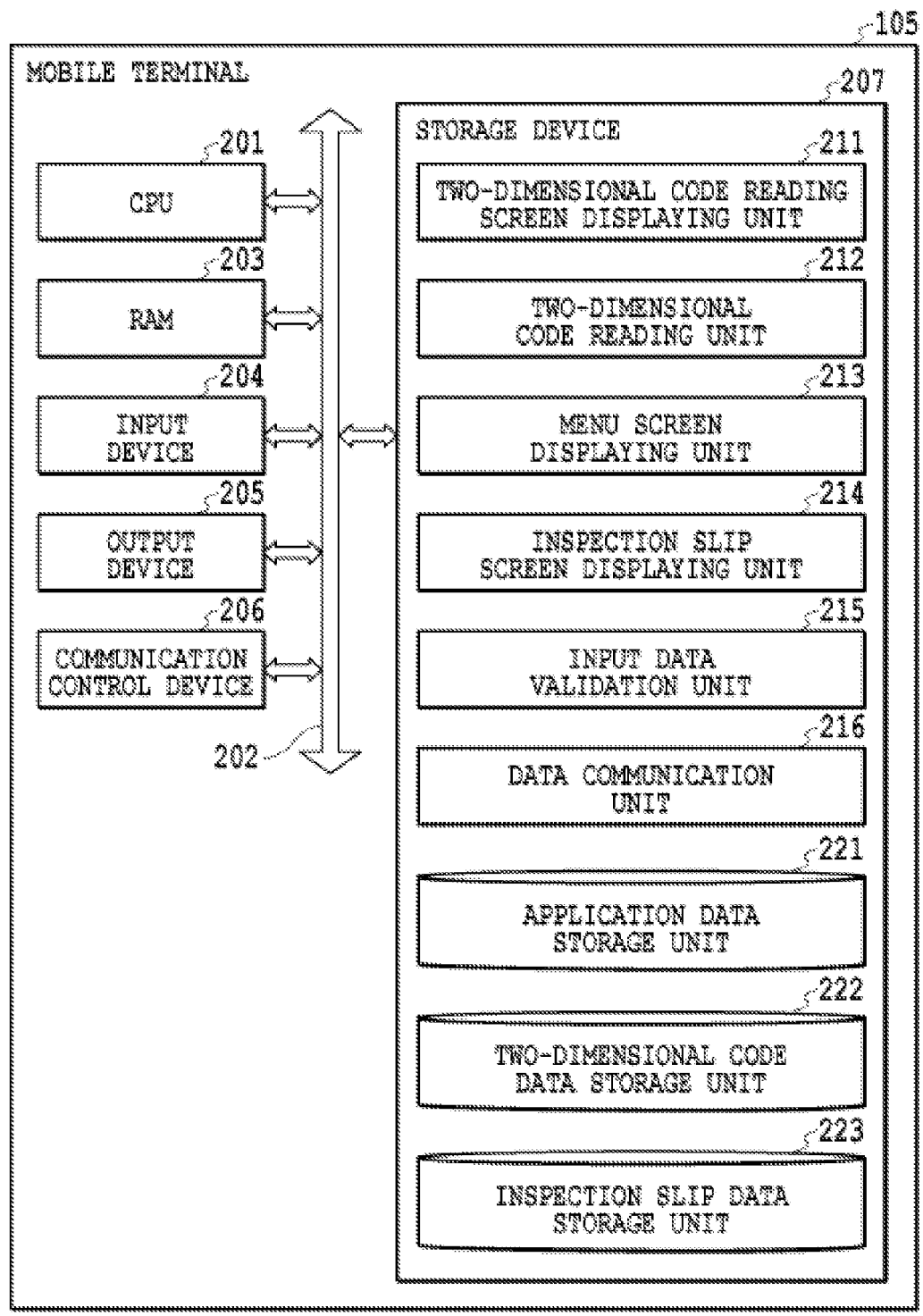
FIG. 2 is a block diagram illustrating the configuration of a mobile terminal according to the embodiment of the present invention.

The configuration of the above described mobile terminal 105 will now be described by referring to the block diagram in FIG. 2.

The mobile terminal 105 has a configuration where a RAM 203, an input device 204, an output device 205, a communication control device 206 and a storage device 207 including a nonvolatile storage medium (a ROM, an HDD, etc.) are coupled to a CPU 201 via a system bus 202. The storage device 207 includes a program storage area to store a software program, for performing the individual functions of the inspection application, and a data storage area to store, for example, inspection slip data. The individual units in the program storage area to be explained below are actually independent software programs and the routines or components thereof. The individual units perform the corresponding functions by being retrieved from the storage device 207 by the CPU 201, loaded into the work area of the RAM 203, and being sequentially executed.

The data storage area of the mobile terminal 105 includes an application data storage unit 221, a two-dimensional code data storage unit 222 and an inspection slip data storage unit 223 in a case wherein only those that are related to the present invention are provided. All of these storage units are predetermined storage areas reserved in the storage device 207.

The application data storage unit 221 stores data related to the inspection application for the consumption facility 106 and the supply facility 107. In this embodiment, screen data (e.g., HTML data) for displaying a two-dimensional code reading screen and an inspection slip screen are stored. However, it should be understood that the two-dimensional code reading screen is not really necessary in a case wherein a general two-dimensional code reading application for the mobile terminal 105 is employed. In this case, the inspection application is started, triggered by reading the two-dimensional code, and the two-dimensional code data is transmitted to the safety management server 101.

The two-dimensional code data storage unit 222 stores two-dimensional code data, which is attached to the main body of the consumption facility 106 or the supply facility 107 and into which facility data for the consumption facility 106 or the supply facility 107 is embedded. In the embodiment, "Parent/Child Classification" used to identify whether the facility is either the consumption facility 106 or the supply facility 107 (the supply facility is a parent and the consumption facility is a child), "Meter Company Number" that is a unique identifier for the consumption facility 106 or the supply facility 107, "Manufacturer Code" that is a unique identifier for the manufacturer of the consumption facility 106 or the supply facility 107, "Model Type" that represents the type of a model, and "Serial Number" that represents a meter serial number are stored. As "Parent/Child Classification", "0" may be set for the consumption facility that is a child, or "1" may be set for the supply facility that is a parent. Further, the "Meter Company Number" is a fixed-length code formed by combining, for example, the "Manufacturer Code", the "Model Type" and the "Serial Number".

The inspection slip data storage unit 223 stores inspection slip data downloaded from the safety management server 101, and inspection result data input by the safety inspectors. In the embodiment, "Meter Company Number", "Safety Inspector Code" for identifying a safety inspector that conducted the inspection, the individual inspection items, and inspection result data obtained for the inspection items are stored.

The software program stored in the program storage area of the mobile terminal 105 includes a two-dimensional code reading screen displaying unit 211, a two-dimensional code reading unit 212, a menu screen displaying unit 213, an inspection slip screen displaying unit 214, an input data validation unit 215, and a data communication unit 216, in a case wherein only those related to the present invention are provided.

The two-dimensional code reading screen displaying unit 211 obtains two-dimensional code reading screen data from the application data storage unit 221, and displays a two-dimensional code reading screen on the output device 205 of the mobile terminal 105.

When the two-dimensional code reading screen is displayed and the state to accept reading of the two-dimensional code is provided, the safety inspector employs the two-dimensional code reading unit 212 to read the two-dimensional code attached to the main body of the consumption facility 106 or the supply facility 107. The obtained two-dimensional code data is converted into digital data by the two-dimensional code reading unit 212, and the digital data is stored in the two-dimensional code data storage unit 222.

The menu screen displaying unit 213 obtains inspection slip screen data from the application data storage unit 221, and displays an inspection menu screen on the output device 205 of the mobile terminal 105 based on the downloaded inspection slip data.

The inspection slip screen displaying unit 214 obtains inspection slip screen data from the application data storage unit 221, and displays an inspection slip screen on the output device 205 of the mobile terminal 105 based on the downloaded inspection slip data.

The input data validation unit 215 performs input data validation for the inspection result data that is obtained through the inspection and is input on the inspection slip screen by the safety inspector. When an error is found as the result of the input data validation, the input data validation unit 215 displays, for example, a popup message on the output device 205 to notify the error, and requests that the safety inspector corrects the error. In a case wherein the input data validation has been normally performed, the input data validation unit 215 stores the inspection result data in the inspection slip data storage unit 223.

The data communication unit 216 transmits the two-dimensional code data and the inspection result data to the safety management server 101. Further, the data communication unit 216 receives the inspection slip data, created by the safety management server 101, and stores the inspection slip data in the inspection slip data storage unit 223.

Figure 3:
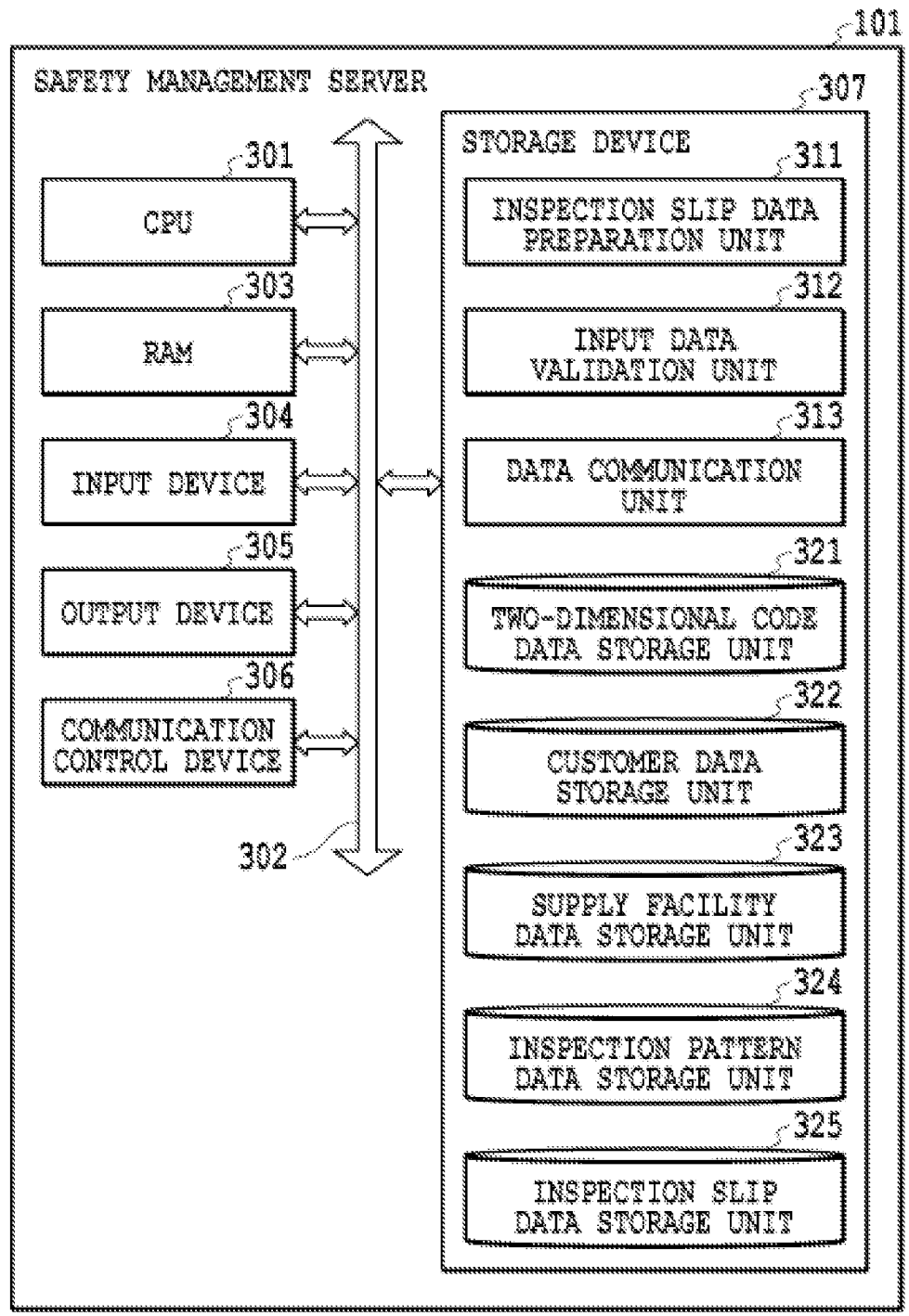
FIG. 3 is a block diagram illustrating the configuration of a safety management server according to the embodiment of the present invention.

The configuration of the above described safety management server 101 will now be described by referring to the block diagram in FIG. 3.

The safety management server 101 has a configuration where a RAM 303, an input device 304, an output device 305, a communication control device 306 and a storage device 307 including a nonvolatile storage medium (a ROM, an HDD, etc.) are coupled to a CPU 301 via a system bus 302. The storage device 307 includes a program storage area to store a software program, for performing the individual functions of the safety management server 101, and a data storage area to store, for example, customer data. The individual units in the program storage area to be explained below are actually independent software programs and the routines or components thereof. The individual units perform the corresponding functions by being retrieved from the storage device 307 by the CPU 301, loaded into the work area of the RAM 303, and being sequentially executed.

A two-dimensional code data storage unit 321 stores the two-dimensional code data received from the mobile terminals 105.

A customer data storage unit 322 stores information for each customer related to the safety operation. In the embodiment, "Customer Code" used to uniquely identify a customer, "Customer Classification" representing the customer's facility (consumption facility 106), either the one associated with the Liquefied Petroleum Gas Act, or the one associated with the Gas Business Act, "Meter Company Number", and "Supply Facility Code" used to uniquely identify the supply facility 107 that is matched with the customer's facility (consumption facility 106) to form a set, are stored in the customer data storage unit 322. For the "Customer Classification", "0" is set in a case wherein the customer facility (consumption facility 106) is associated with the Liquefied Petroleum Gas Act, i.e., in a case wherein the customer facility is consumption facility for the general supply form or for concentric gas supply form, or "1" is set in a case wherein the customer facility is associated with the Gas Business Act, i.e., in a case wherein the customer facility is consumption facility for community gas supply form. Further, the "Meter Company Number" stored in the customer data storage unit 322 is the number for the customer facility (consumption facility 106).

A supply facility data storage unit 323 is stores information for each supply facility 107 related to the safety operation. In the embodiment, "Supply Facility Code" used to uniquely identify the supply facility 107, "Supply Classification" representing the supply classification of the supply facility 107, either the general supply form or the concentric supply form, "Cylinder Classification", representing the gas cylinder related to the supply facility 107, either a cylinder or a bulk, and "Meter Company Number" are stored in the supply facility data storage unit 323. For the "Supply Classification", "1" is set in a case wherein the facility is for concentric supply form, or "0" is set for the other case. Furthermore, "2" can also be set in a case wherein data for the community gas supply form is also managed. Moreover, for the "Cylinder Classification", "0" is set for a gas cylinder, or "1" is set for a gas bulk. Further, the "Meter Company Number" stored in the supply facility data storage unit 323 is the number for the supply facility 107.

An inspection pattern data storage unit 324 is stores pattern data for inspection items that are selected based on the facility data for the consumption facility 106 and the supply facility 107. In the embodiment, "ID" that is an unique sequence number to uniquely identify the pattern data, "Customer Classification", "Supply Classification", "Cylinder Classification", "Periodical Inspection" representing whether or not a periodical inspection is required as an inspection item by referring to a set of the "Customer Classification", the "Supply Classification" and the "Cylinder Classification", "Piping Inspection" representing whether a piping inspection is required by referring to the same set, "Bulk Check" representing whether a bulk check is required by referring to the same set, "Pipeline Leakage" representing whether the pipeline leakage examination is required by referring to the same set, and "Part Replacement" representing whether part replacement is required by referring to the same set, are stored. For the data items related to the individual inspections, "1" is set in a case wherein a data item is necessary as an inspection item by referring to, for example, the "Customer Classification", the "Supply Classification" and the "Cylinder Classification", or "0" is set in a case wherein a data item is not necessary as an inspection item.

An inspection slip data storage unit 325 is stores the inspection slip data that is created and the inspection result data received from the mobile terminal 105. In this embodiment, "Meter Company Number", "Safety Inspector Code" to identify a safety inspector that conducted the inspection, the individual inspection items, and the inspection result data related to these inspection items are stored.

Next, the inspection slip data creation process performed in the embodiment will be described in detail, while referring to the flowchart in FIG. 8 and tables in FIGS. 4 to 7.

Figure 8:
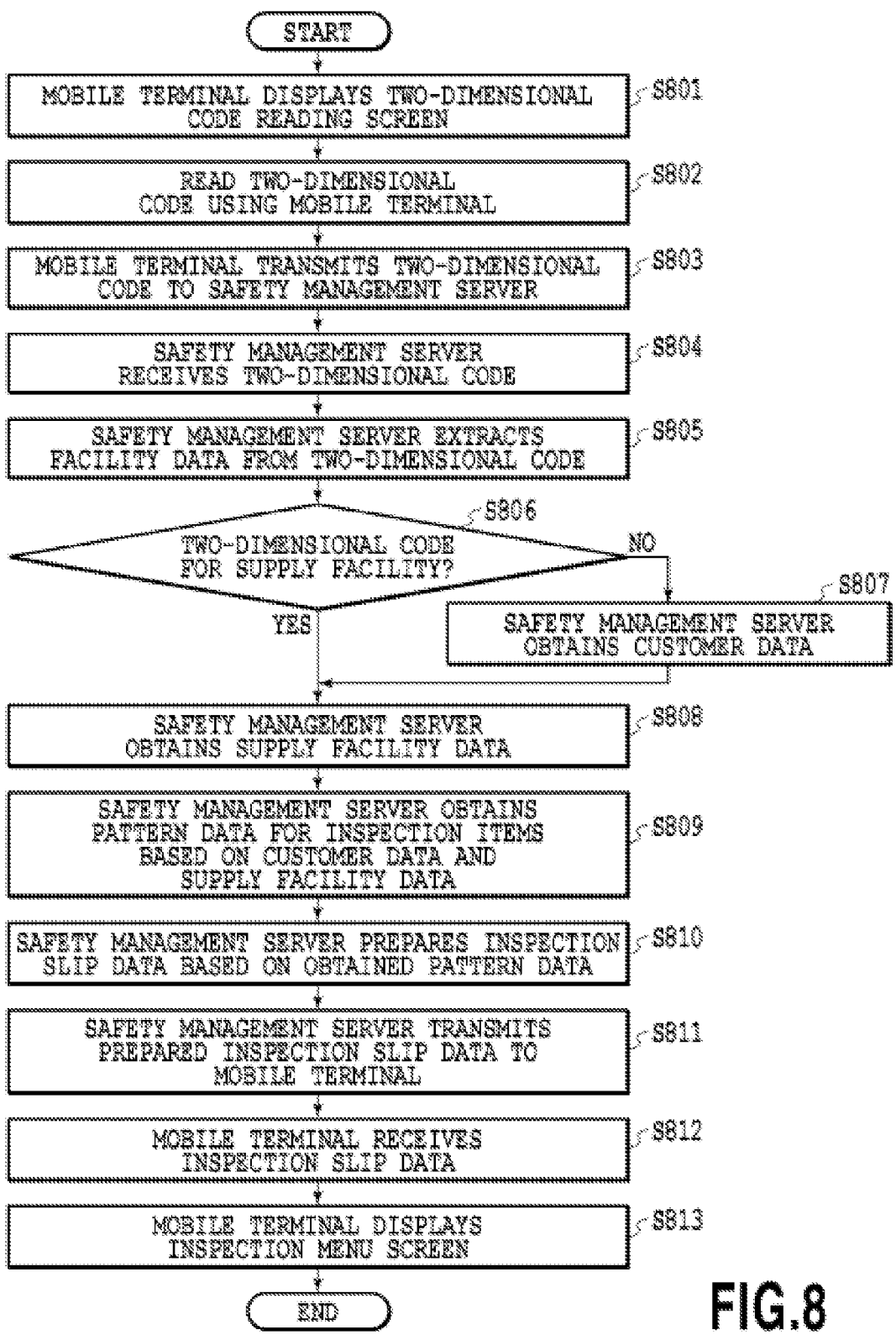
FIG. 8 is a flowchart showing the inspection slip data creation processing according to the embodiment of the present invention.

FIG. 8 is a flowchart showing the inspection slip data creation process performed in the embodiment of the present invention. First, at step 801, the two-dimensional code reading screen displaying unit 211 starts the inspection application of the mobile terminal 105, and displays the two-dimensional code reading screen on the mobile terminal 105. At this time, since the state wherein reading of the two-dimensional code is available is simply provided, it should be understood that the inspection application can be replaced with another application. Following this, the safety inspector reads the two-dimensional code, attached to the consumption facility 106 or the supply facility 107, by using the two-dimensional reading unit 212 (step 802).

The two-dimensional code data read at step 802 in this embodiment is shown in FIG. 4. The individual data items in FIG. 4 are embedded into the two-dimensional code by being separated using delimiters, such as commas. In this embodiment, the content for "Parent/Child Classification" of the two-dimensional code data in FIG. 4 is "0" for the consumption facility that serves as a child, or "1" for the supply facility that serves as a parent. Therefore, the two-dimensional code data in FIG. 4 indicates the one attached to the consumption facility 106. Further, "Meter Company Number" is a fixed-length code formed by combining "Manufacturer Code", "Model Type" and "Serial Number".

Referring again to FIG. 8, when the two-dimensional code data has been successfully read at step 802, the two-dimensional code reading unit 212 transmits the obtained two-dimensional code data to the safety management server 101 (step 803). The safety management server 101 receives the two-dimensional code data (step 804), and extracts, from the received two-dimensional code data, the "Parent/Child Classification" and the "Meter Company Number" that are one type of facility information (step 805). Further, based on the extracted "Parent/Child Classification", the safety management server 101 determines whether the two-dimensional code that has been read is for the consumption facility 106 or for the supply facility 107 (step 806).

In a case wherein it is determined at step 806 that the two-dimensional code is for the consumption facility 106, the processing proceed to "No", and the safety management server 101 obtains customer data by employing, as a search key, the meter company number extracted from the two-dimensional code data (step 807). The customer data for the embodiment is shown in FIG. 5. As the "Customer Classification" of the customer data in FIG. 5, "0" is set in a case wherein the customer facility (consumption facility 106) is associated with the Liquefied Petroleum Gas Act, i.e., wherein the customer facility is consumption facility for general supply form or consumption facility for concentric supply form, or "1" is set in a case wherein the customer facility is associated with the Gas Business Act, i.e., wherein the customer facility is consumption facility for community supply form. Further, "Meter Company Number" is the one provided for the customer facility (consumption facility 106). Moreover, "Supply Facility Code" is a code that uniquely represents the supply facility 107 that is matched with the customer facility (consumption facility 106) to form a set. The "Supply Facility Code" is included in the customer data, mainly because, for this process route for obtaining data from the customer data, the "Meter Company Number" included in the two-dimensional code to be read is the number provided for the consumption facility 106, and is to be employed later as a search key at step 808 for searching the supply facility data. In a case wherein the "Meter Company Number" included in the two-dimensional code is the one provided for the supply facility 107, the supply facility data can be searched by employing the "Meter Company Number" as a search key.

After the customer data has been obtained, the safety management server 101 further obtains supply facility data by employing, as a search key, the supply facility code obtained from the customer data (step 808). The supply facility data in this embodiment is shown in FIG. 6. As the "Supply Classification" of the supply facility data in FIG. 6, "1" is set for the facility of concentric gas supply form, or "0" is set for the other case. Further, as the "Cylinder Classification", "0" is set in a case wherein a gas cylinder is a cylinder, or "1" is set in a case wherein a gas cylinder is a bulk. After step 808, the processing advances to step 809.

When the two dimensional code is for the supply facility 107 at step 806, the process proceed to "Yes", and the safety management server 101 obtains supply facility data by employing, as a search key, the meter company number extracted from the two-dimensional code (step 808). It should be noted that the search key at step 808 differs from the search key employed for the "No" route (for the case of the consumption facility 106) at step 806. Thereafter, the processing moves from step 808 to step 809.

The safety management server 101 thereafter searches the inspection pattern data based on the customer data and the supply facility data that have been obtained, more specifically, by employing, as search keys, the "Customer Classification" obtained from the customer data and the "Supply Classification" and the "Cylinder Classification" obtained from the supply facility data to obtain the correlated record (step 809). The inspection pattern data for the embodiment is shown in FIG. 7. The inspection pattern data is formed by the combination of "Customer Classification", "Supply Classification" and "Cylinder Classification", and the items selectable for the individual inspections that are "Periodical Inspection" and the items subsequent to "Periodical Inspection", are stored. The contents of the inspection pattern data will be described. In a case wherein, for example, the supply form is concentric supply (i.e., the supply form for which the Liquefied Petroleum Gas Act is applied) and the gas cylinder is a cylinder (the case of "0" for the customer classification, "1" for the supply classification and "0" for the cylinder classification, i.e., the case of "5" for ID), the inspections for which "1" is set in the items for the necessity of the individual inspections, that are "Periodical Inspection" and the items subsequent to "Periodical Inspection", are the "Periodical Inspection", the "Piping Inspection" and the "Part Replacement". Therefore, in this case, three inspections can be regarded as selectable inspections, and are to be displayed on the inspection menu screen that will be described later.

In the inspection pattern data in FIG. 7, there is data where "99" is set as the customer classification, and this represents a case wherein the customer classification is not obtained, i.e., a case wherein the facility is the consumption facility 107 (a case wherein the Yes route is taken at step 806).

Subsequently, the safety management server 101 selects the inspection items based on the obtained inspection pattern data to create inspection slip data comprising data for the selected inspection items (step 810). In a case wherein a plurality of inspections are to be selected (e.g., the "Periodical Inspection", the "Piping Inspection" and the "Part Replacement"), the inspections to be conducted should be narrowed down, and therefore, the inspection slip data includes inspection menu screen data for selection.

Thereafter, the safety management server 101 transmits the created inspection slip data to the mobile terminal 105 (step 811).

The mobile terminal 105 receives the inspection slip data from the safety management server 101 (step 812) to display the inspection menu screen (step 813). When the safety inspector selects, on the inspection menu screen, a link or a button for an inspection to be conducted, the menu screen is shifted to each inspection slip screen. The inspection slip screen includes not only the individual inspection items, but also user interfaces, such as inspection result input columns and choices, in which the safety inspector can input the inspection results. In a case wherein there is only one inspection selectable from the inspection pattern data obtained at step 809, displaying of the inspection menu screen may be skipped, and the inspection slip screen associated with the one inspection may be displayed directly.

As another embodiment, based on QR code that has been read, the safety management server 101 may examine safety operation schedule data (not shown) of the consumption facility 106 or the supply facility 107 that is associated with the QR code, and in a case wherein an inspection to be conducted can be specified based on schedule data, according to which the date where the QR code has been read (i.e., the date for the performance of the safety operation, such as the system date for the server) is designated as an operation due date, may display the inspection menu screen or the inspection slip screen related to the specified inspection.

Next, the inspection slip data transmission process according to the embodiment will be described in detail, while referring to the flowchart in FIG. 9.

Figure 9:
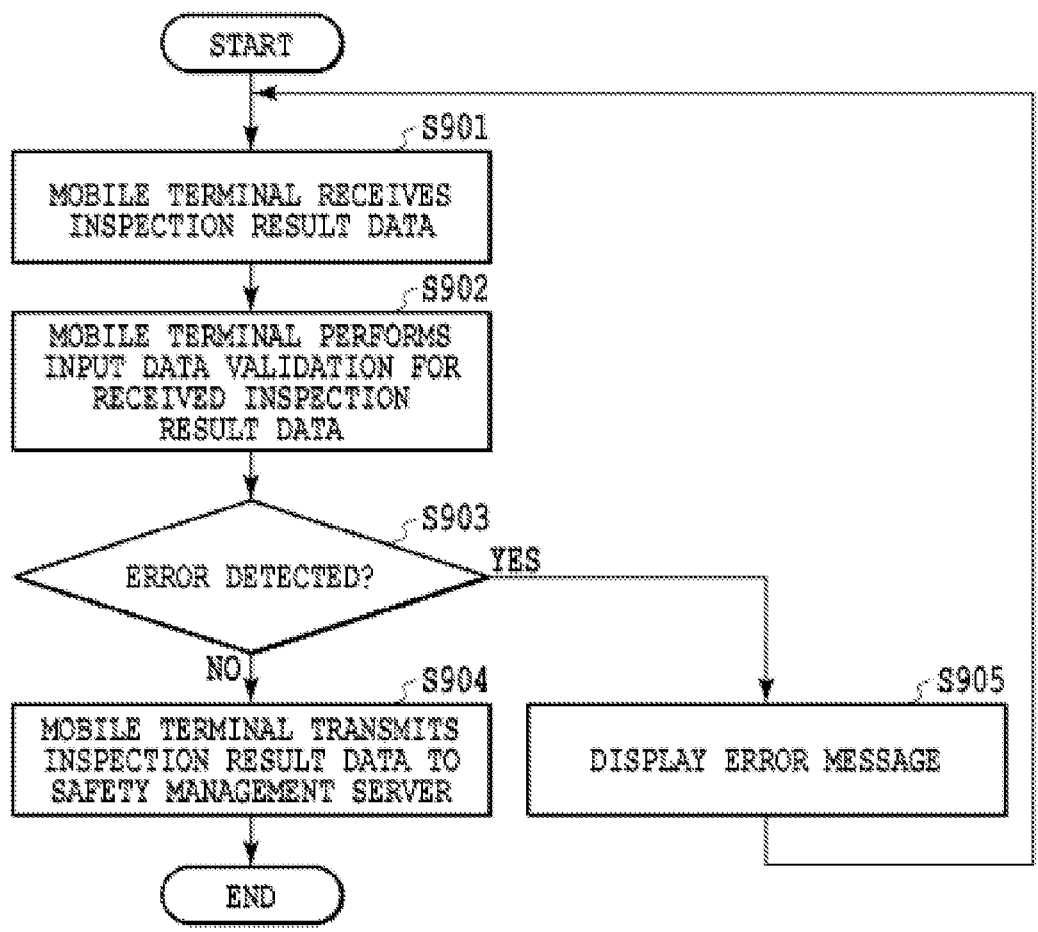
FIG. 9 is a flowchart showing the inspection slip data transmission processing according to the embodiment of the present invention.

FIG. 9 is a flowchart showing the inspection slip data transmission process according to the embodiment of the present invention. First, at step 901, the data communication unit 216 receives the inspection result data that has been input by the safety inspector via the inspection slip screen displayed on the mobile terminal 105. Following this, the input data validation unit 215 performs input data validation for the inspection result data (step 902). Here, input data validation is, for example, check to determine whether compulsory input items have been entered, check of contradictory (consistency) of data, and check of valid type of data.

In a case wherein an error is detected through the input data validation at step 902, the process proceeds to "Yes", and the input data validation unit 215 displays an error message representing the detected error on the screen of the mobile terminal 105, and requests that the safety inspector corrects the error (step 905). In this case, the process returns to step 901, and the processes at steps 901 to 903 and 905 are repeated until no errors are detected by input data validation.

In a case wherein no errors are detected though the input data validation at step 902, the process proceeds to "No", and the data communication unit 216 transmits the inspection result data to the safety management server 101 (step 904).

The inspection result data transmitted to the safety management server 101 is stored in the storage area of the safety management server 101, and can be browsed by the client computer 103 and the mobile terminal 105. Further, the safety management server 101 may aggregate the inspection result data for each of the consumption facility 106 and the supply facility 107 collected at the safety management server 101, and may create summary data for, for example, the inspection status of each area. Furthermore, input data validation that cannot be performed only by using the mobile terminal 105, e.g., validation of consistency relative to the data stored in the safety management server 101 or another server, may be performed, and in a case wherein an error is detected, the inspection result data may be returned as error data to the mobile terminal 105.

The invention claimed is:

1. A method for creating inspection slip data for consumption facility and supply facility associated with liquid petroleum (LP) gas in a safety management server, the method comprising:
the safety management server receiving two-dimensional code data that is read via a mobile terminal and includes facility data for the consumption facility or the supply facility;
the safety management server extracting the facility data from the received two-dimensional code data; and
the safety management server selecting, based on the extracted facility data, inspection item data that are components of the inspection slip data, to create the inspection slip data, wherein the selecting the inspection item data includes specifying an inspection to be performed from safety operation schedule data for which a system date of the safety management server is designated as an operation due date, to select the inspection item data based on the specified inspection.

2. The method according to claim 1, wherein the extracted facility data includes at least data representing the extracted facility data as data related to the consumption facility or as data related to the supply facility.

3. The method according to claim 2, wherein the creating the inspection slip data includes creating inspection menu data for specifying a type of an inspection slip.

4. The method according to claim 3 further comprising:
the safety management server transmitting, to the mobile terminal, the created inspection slip data; and
the safety management server receiving inspection result data that is entered via the mobile terminal.

5. The method according to claim 4, wherein the two-dimensional code data is OR code data.

6. The method according to claim 3, wherein the two-dimensional code data is OR code data.

7. The method according to claim 2 further comprising:
the safety management server transmitting, to the mobile terminal, the created inspection slip data; and
the safety management server receiving inspection result data that is entered via the mobile terminal.

8. The method according to claim 7, wherein the two-dimensional code data is OR code data.

9. The method according to claim 2, wherein the two-dimensional code data is OR code data.

10. The method according to claim 1, wherein the creating the inspection slip data includes creating inspection menu data for specifying a type of an inspection slip.

11. The method according to claim 10 further comprising:
the safety management server transmitting, to the mobile terminal, the created inspection slip data; and
the safety management server receiving inspection result data that is entered via the mobile terminal.

12. The method according to claim 11, wherein the two-dimensional code data is OR code data.

13. The method according to claim 10, wherein the two-dimensional code data is OR code data.

14. The method according to claim 1 further comprising:
the safety management server transmitting, to the mobile terminal, the created inspection slip data; and
the safety management server receiving inspection result data that is entered via the mobile terminal.

15. The method according to claim 14, wherein the two-dimensional code data is OR code data.

16. The method according to claim 1, wherein the two-dimensional code data is QR code data.

17. A computer-readable storage medium having computer-executable instructions which causes a safety management server to perform a method for creating inspection slip data for consumption facility and supply facility associated with liquid petroleum (LP) gas, the method comprising:
the safety management server receiving two-dimensional code data that is read via a mobile terminal and includes facility data for the consumption facility or the supply facility;
the safety management server extracting the facility data from the received two-dimensional code data; and the safety management server selecting, based on the extracted facility data, inspection item data that are components of the inspection slip data, to create the inspection slip data, wherein the selecting the inspection item data includes specifying an inspection to be performed from safety operation schedule data for which a system date of the safety management server is designated as an operation due date, to select the inspection item data based on the specified inspection.

18. A safety management server for creating inspection slip data for consumption facility and supply facility associated with liquid petroleum (LP) gas, the safety management server comprising:

a processing processor;

a memory;

a data communication unit for receiving two-dimensional code data that is read via a mobile terminal and includes facility data for the consumption facility or the supply facility; and an inspection slip data preparation unit for extracting the facility data from the received two-dimensional code data and selecting, based on the extracted facility data, inspection item data that are components of the inspection slip data, to create the inspection slip data, wherein the selecting the inspection item data includes specifying an inspection to be performed from safety operation schedule data for which a system date of the safety management server is designated as an operation due date, to select the inspection item data based on the specified inspection.

* * * * *